(12) United States Patent
Barbe et al.

(10) Patent No.: US 11,509,487 B2
(45) Date of Patent: Nov. 22, 2022

(54) SYSTEM FOR ROLLOUT OF CERTIFICATES TO CLIENT AND SERVER INDEPENDENT OF PUBLIC KEY INFRASTRUCTURE

(71) Applicant: DATTO, INC., Norwalk, CT (US)

(72) Inventors: Charles A. Barbe, Rochester, NY (US); Christopher S. Sprague, Norwalk, CT (US); Christopher A. Hoult, Reading (GB)

(73) Assignee: Kaseya Limited, Dublin (IE)

( * ) Notice: Subject to any disclaimer, the term of this patent is extended or adjusted under 35 U.S.C. 154(b) by 70 days.

(21) Appl. No.: 17/021,232

(22) Filed: Sep. 15, 2020

(65) Prior Publication Data

US 2021/0288820 A1 Sep. 16, 2021

Related U.S. Application Data

(60) Provisional application No. 62/990,089, filed on Mar. 16, 2020.

(51) Int. Cl.
*H04L 9/32* (2006.01)
*H04L 9/08* (2006.01)

(52) U.S. Cl.
CPC .......... *H04L 9/3265* (2013.01); *H04L 9/0825* (2013.01); *H04L 9/3215* (2013.01); *H04L 9/3268* (2013.01)

(58) Field of Classification Search
CPC ... H04L 9/3265; H04L 9/0825; H04L 9/3215; H04L 9/3268; H04L 9/32; H04L 9/08
See application file for complete search history.

(56) References Cited

U.S. PATENT DOCUMENTS 10,454,689 B1 10/2019 Sharifi Mehr
2004/0243805 A1* 12/2004 Enokida ................ H04L 9/0891
713/175

(Continued)

FOREIGN PATENT DOCUMENTS

WO WO 2016/153423 A1 9/2016

OTHER PUBLICATIONS

Author Unknown, Publication titled *"Method to prevent the loss of control of remote computing platforms"*, Publication Date: Dec. 10, 2003.

*Primary Examiner* — Quazi Farooqui
(74) *Attorney, Agent, or Firm* — Maschoff Brennan

(57) ABSTRACT

A first entity stores an issuer digital certificate published by a certificate authority (CA) and signed by the issuer certificate; and also stores an old issuer digital certificate published by the CA prior to publication of the issuer digital certificate and an old first entity digital certificate signed by the old issuer digital certificate. The first entity attempts to initiate a secure communication session with a second entity by receiving a second entity digital certificate from the second entity via an electronic network, and sending either the first entity digital certificate or the old first entity digital certificate to the second entity based on which of the issuer digital certificate or the old issuer digital certificate is effective to authenticate the second entity digital certificate received from the second entity. The secure communication session is conducted only if the attempt to initiate the secure communication session is successful.

17 Claims, 5 Drawing Sheets

(56) References Cited

U.S. PATENT DOCUMENTS

| | | | |
|---|---|---|---|
| 2012/0110338 A1* | 5/2012 | Druschel | G06F 21/6218 |
| | | | 713/182 |
| 2017/0279619 A1* | 9/2017 | Yang | H04L 9/3268 |
| 2018/0220309 A1* | 8/2018 | Gomes | G05D 1/0022 |
| 2019/0272219 A1* | 9/2019 | Wei | G06F 9/45545 |
| 2020/0028699 A1 | 1/2020 | Sharifi Mehr | |

* cited by examiner

SYSTEM FOR ROLLOUT OF CERTIFICATES TO CLIENT AND SERVER INDEPENDENT OF PUBLIC KEY INFRASTRUCTURE

CROSS REFERENCE TO RELATED APPLICATION

This application claims priority to U.S. Provisional Patent Application Ser. No. 62/990,089, filed Mar. 16, 2020, the entirety of which is fully incorporated herein by reference.

BACKGROUND

The following relates to computing device and network security systems and methods, rollout of new certificates for clients and servers, and the like. It finds particular application in conjunction with rollout of new certificates for backup systems and Business Continuity and Disaster Recovery (BCDR) systems and the like, and will be described with particular reference thereto. However, it is to be appreciated that the following is also amenable to other like applications.

BRIEF DESCRIPTION

In some nonlimiting illustrative embodiments disclosed herein, a non-transitory storage medium stores instructions readable and executable by an electronic processor of a first entity to cause the first entity to: store an issuer digital certificate published by a certificate authority (CA) and a first entity digital certificate signed by the issuer certificate; store an old issuer digital certificate published by the CA prior to publication of the issuer digital certificate and an old first entity digital certificate signed by the old issuer digital certificate; attempt to initiate a secure communication session with a second entity via an electronic network by operations including receiving a second entity digital certificate from the second entity via the electronic network and sending either the first entity digital certificate or the old first entity digital certificate to the second entity via the electronic network based on which of the issuer digital certificate or the old issuer digital certificate is effective to authenticate the second entity digital certificate received from the second entity; and conduct the secure communication session with the second entity via the electronic network only if the attempt to initiate the secure communication session is successful. The secure communication session may in some embodiments be a mutual Transport Layer Security (TLS) secure communication session.

In some nonlimiting illustrative embodiments of the non-transitory storage medium of the immediately preceding paragraph, the conducting of the secure communication session with the second entity via the electronic network includes receiving incremental backup data for the second entity via the secure communication session, and the instructions are readable and executable by the electronic processor of the first entity to further cause the first entity to update a backup of data of the second entity with the incremental backup data for the second entity received via the secure communication session.

In some nonlimiting illustrative embodiments disclosed herein, a system is disclosed, including a first entity and a second entity. The first entity comprises at least one electronic processor. The first entity stores an issuer digital certificate published by a certificate authority (CA) and a first entity digital certificate signed by the issuer digital certificate, and further stores an old issuer digital certificate published by the CA prior to publication of the issuer digital certificate and an old first entity digital certificate signed by the old issuer digital certificate. The second entity comprises at least one electronic processor. The second entity stores a second entity issuer digital certificate published by the CA and a second entity digital certificate signed by the second entity issuer digital certificate. The first entity is programmed to initiate a secure communication session with the second entity via an electronic network by receiving the second entity digital certificate from the first entity via the electronic network and sending either the first entity digital certificate or the old first entity digital certificate to the second entity via the electronic network based on which of the issuer digital certificate or the old issuer digital certificate is effective to authenticate the second entity digital certificate received from the second entity. The second entity is configured to attempt to authenticate the first entity digital certificate received from the first entity or the old first entity digital certificate received from the first entity using the second entity issuer digital certificate. The secure communication session is conducted contingent upon successful authentication by the second entity of the first entity digital certificate received from the first entity or the old first entity digital certificate received from the first entity.

In some nonlimiting illustrative embodiments of the system of the immediately preceding paragraph, the first entity is further programmed to, at a first entity cadence, determine whether a new issuer digital certificate different from the issuer digital certificate has been published by the CA and if so then: generate a public/private key pair at the first entity, construct a certificate signing request (CSR) including a public key of the public/private key pair and signed using a private key of the public/private key pair, and receive a new first entity digital certificate from the CA in response to transmitting the CSR to the CA; update the old issuer digital certificate to include the issuer digital certificate and update the old first entity digital certificate to include the first entity digital certificate; and update the issuer digital certificate to be the new issuer digital certificate and update the first entity digital certificate to be the new first entity digital certificate. In some such embodiments, the second entity is configured to, at a second cadence that is slower than the first cadence, determine whether a new issuer digital certificate different from the second entity issuer digital certificate has been published by the CA and if so then generate a second entity public/private key pair, construct a second entity CSR including a second entity public key of the second entity public/private key pair and signed using a second entity private key of the second entity public/private key pair, and receive a new second entity digital certificate from the CA in response to transmitting the second entity CSR to the CA. In some embodiments the first cadence is at least ten times faster than the second cadence.

In some nonlimiting illustrative embodiments disclosed herein, a method is disclosed, comprising: storing a backup at a first entity of at least a portion of a file system of a second entity; at a first cadence, automatically checking with a certificate authority (CA) for updates of an issuer digital certificate stored at a first entity comprising at least one electronic processor; at a second cadence that is slower than the first cadence, automatically checking with the CA for updates of an issuer digital certificate stored at a second entity comprising at least one electronic processor; initiating a secure communication session via an electronic network between the first entity and the second entity by operations including sending a second entity digital certificate signed by the CA from the second entity to the first entity and sending a first entity digital certificate signed by the CA from the first entity to the second entity; via the initiated secure communication session, transmitting incremental backup data from the second entity to the first entity; and at the first entity, updating the backup with the incremental backup data. In some embodiments, the first cadence is at least ten times faster than the second cadence. In some embodiments, the secure communication session is a mutual Transport Layer Security (TLS) secure communication session.

In some nonlimiting illustrative embodiments of the method of the immediately preceding paragraph, the method further includes storing at the first entity an issuer digital certificate published by the CA and a first entity digital certificate signed by the issuer digital certificate and further storing an old issuer digital certificate published by the CA prior to publication of the issuer digital certificate and an old first entity digital certificate signed by the old issuer digital certificate. In these embodiments, the sending of a first entity digital certificate signed by the CA from the first entity to the second entity comprises sending either the first entity digital certificate or the old first entity digital certificate to the second entity via the electronic network based on which of the issuer digital certificate or the old issuer digital certificate is effective to authenticate the second entity digital certificate.

DETAILED DESCRIPTION

Figure 1:
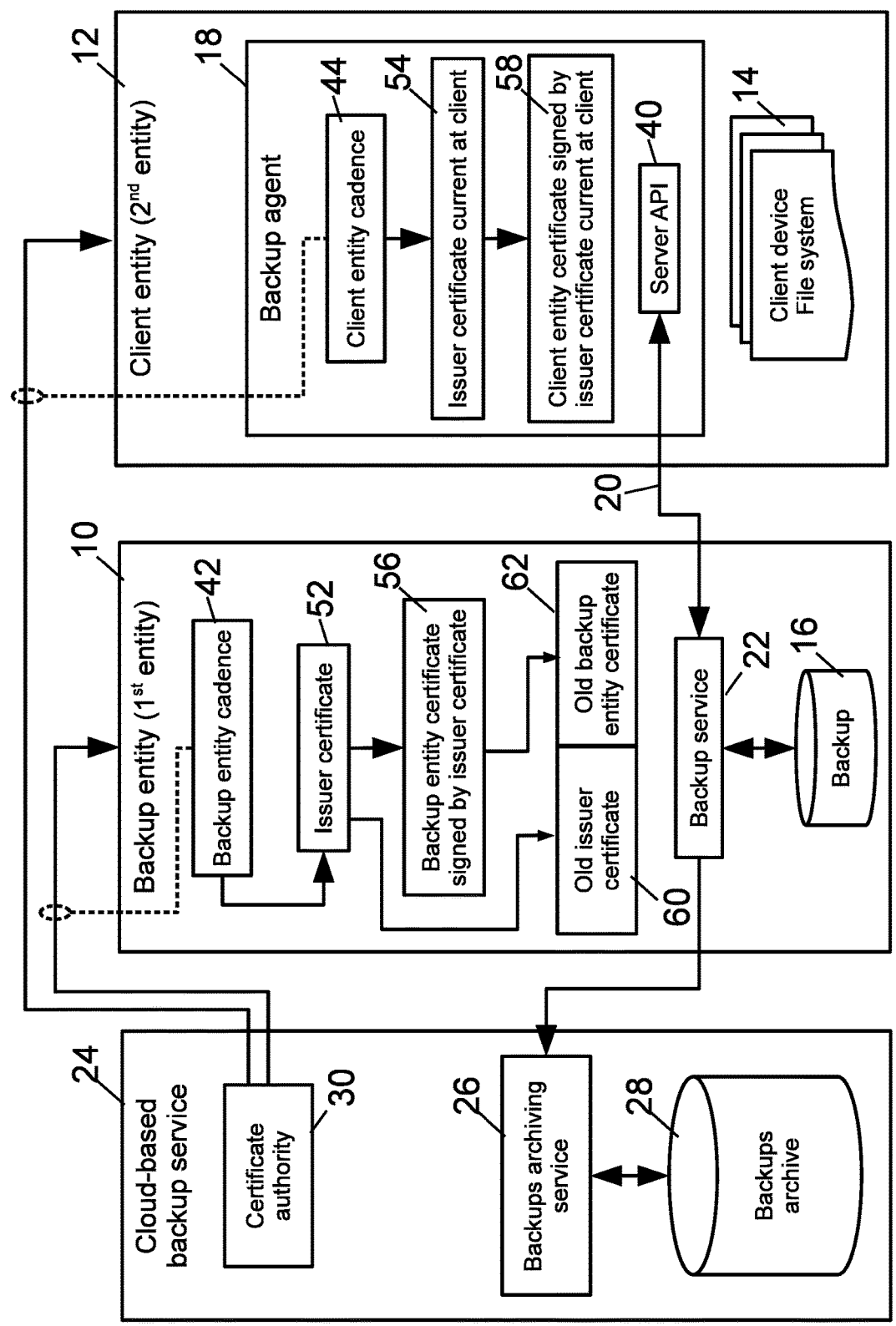
FIG. 1 diagrammatically illustrates a Business Continuity and Disaster Recovery (BCDR) system employing authentication with fallback in case of new issuer certificate implementation latency.

A public key infrastructure (PKI) provides a framework for creating and distributing digital certificates (also referred to by similar nomenclatures such as public key certificates or identity certificates) for conducting communications between entities (e.g. computing devices or computing networks) using (at least in part) asymmetric public key cryptography. In this type of cryptography, a pair of keys: one public key and one private key, are created by each entity engaged in the communication. The owner entity of each key pair distributes the public key to other entities with which it wishes to securely communicate, while the private key is securely retained by the owner entity. Any entity with the distributed public key can encrypt messages using that public key, and the encrypted messages can only be decrypted using the private key, which remains in sole possession of the owner entity. This provides assurance to the entity sending the encrypted message that it can only be decrypted and read by the entity possessing the corresponding private key.

However, an entity engaging in encrypted communication using a public key must trust that the corresponding private key is actually possessed by the entity with which it intends to securely communicate. That is, the entity using the public key must have assurance that the public key is associated to the intended communication target.

In the PKI framework, such assurance is provided by a certificate authority (CA), which is a trusted third party. To this end, each entity creates its public/private key pair, and then generates a certificate signing request (CSR) for the public key and sends it to the CA. The CSR includes information identifying the requesting entity, which is signed using the private key of the requesting entity. The CSR also includes the paired public key for which the certificate is being requested. The CA then decrypts the encrypted information using the public key included with the CSR, and if the CSR is approved then the CA sends back to the requesting entity a digital certificate that identifies (i.e. binds) the public key to the requesting entity. The digital certificate identifies the public key and its owner entity, and the certificate is digitally signed by the CA using a private key corresponding to an issuer certificate published by CA. The issuer certificate may be a trusted root certificate that is self-signed by the CA, or the issuer certificate may be an intermediate certificate that is in turn signed by another private key corresponding to another published intermediate certificate or corresponding to a root certificate. (A chain of intermediate certificate(s) should always be rooted in a trusted root certificate). The entities wishing to engage in secure communication then exchange digital certificates (and, depending upon the type of encryption to be used for the subsequent content-containing messages, possibly other secret information such as private keys secured using the exchanged digital certificates), and each entity can authenticate the digital certificate it receives using the published issuer certificate.

A digital certificate may become unusable for various reasons. Typically, a certificate has an expiration date, or may become unusable prior to expiration if it is suspected that the corresponding private key may have been compromised. In such cases, a new digital certificate is published. This takes time, as the entity creates a new public/private key pair, and creates the CSR for the public key and transmits it to the CA; the CA processes the CSR and, if approved, creates a new digital certificate using the issuer certificate currently in use at the CA; and the CA transmits the new digital certificate to the requesting entity.

The situation is more problematic if a new issuer certificate is to be published. In this case, the new issuer certificate is created and either self-signed at the CA (for a new trusted root certificate) or signed by way of a CSR sent to an underlying CA (in the case of an intermediate certificate). The new issuer certificate is then published to all entities that rely upon it. Each entity receiving the new issuer certificate must then create a new pair of public and private keys, and go through the CSR process to obtain a new digital certificate for the new keys pair signed by the new issuer certificate.

It is recognized herein that a problem can arise when a new issuer certificate is published. Particularly, critical ongoing or frequent encrypted communications can be interrupted by delays in the parties' adoption of the new issuer certificate.

For example, in a Business Continuity and Disaster Recovery (BCDR) system, incremental backups of a client entity are performed on a frequent basis, e.g. every few minutes or every hour, to minimize time latency between the last incremental backup and the timepoint of any incident necessitating data recovery. In a typical approach for performing an incremental backup, a backup entity securely connects as a client with a backup agent installed on the client entity and receives and stores the incremental backup data. To establish the secure connection, the backup and client entities exchange digital certificates both signed by the issuer certificate. In the case of a new issuer certificate being published, the client and backup entities may receive the new issuer certificate and update their respective entity certificates at different times. During the time between the first entity updating its certificate and the second entity updating its certificate, no incremental backups can be performed, because any attempt to initiate a secure communication session will fail due to the mismatch of issuer certificates stored at the respective backup and client entities. If an incident occurs at the client necessitating data recovery, this delay potentially could result in lost data for a time interval that is substantially longer than the design-basis incremental backup time interval of the BCDR service. For example, the BCDR provider may provide assurance of a time latency of no more than, e.g., one hour, but due to the problem in updating the issuer certificates the actual time latency might be many hours or even days or longer.

This is merely one example, but more generally any type of critical ongoing or frequent encrypted communication can be interrupted by publication of a new issuer certificate. For example, delays can be introduced in frequent electronic financial transactions conducted between financial institutions or the like.

The publication of a new issuer certificate can be done using either a push or pull framework, or a combination of these depending on the entity being updated. In a push framework, the CA initiates the process by notifying an entity of the new issuer certificate. Upon receiving this notification, the entity then requests the new issuer certificate. In a pull framework, the entity initiates the process by interrogating the CA for the current issuer certificate, which it then checks against the issuer certificate currently stored at the entity. The choice of push or pull framework depends in part on the nature of the entity. For example, if an entity is closely tied to the CA, for example, controlled by a common information technology (IT) company, then the CA may push the new issuer certificate to the closely tied entity. On the other hand, if the entity is not closely tied to the CA, such as in the case of a backup agent of a BCDR running on a client computer or network, or the case of a web browser of a customer of a retail website, then the new issuer certificate is likely to be received in a pull framework, for example when the IT department of the client computer or network performs the next software update of the backup agent, or when a customer updates his or her web browser or reboots the computer. In the pull framework, the time latency between publication of the new issuer certificate and its implementation at the entity is likely to be longer, and potentially more variable, as compared with a push framework. However, even in a push framework the CA usually does not simultaneously push the new issuer certificate to all users at once, since doing so would likely overload the server of the CA as all users would then be nearly simultaneously requesting the new issuer certificate and then shortly thereafter submitting CSRs.

In some environments such as transport layer security (TLS), only one party to a communication provides a certificate to the other party. For example, a retail website server provides the web browser of a customer with a digital certificate, but the web browser usually does not reciprocate by providing a certificate to the retailer server. In other environments, such as mutual TLS, both parties to the communication exchange certificates. When a certificate is not authenticated by a receiving party, the usual consequence is that the receiving party refuses to proceed with the communication session. If one party has received a new issuer certificate and updated accordingly while the other party has not, then neither party will be able to validate the certificate received from the other party, since the two parties have different issuer certificates. Communication between the two entities will therefore not be possible over the time interval between when the first party receives the new issuer certificate and updates its own certificate, and when the second party receives the new issuer certificate and updates its own certificate.

One possible solution to this problem is to exchange self-signed certificates and then proceed with encrypted communications using the self-signed certificates. However, doing so entails heightened security risk, because neither party has assurance as to the identity of the other party.

Disclosed herein are improvements which remedy these and other problems.

With reference to FIG. 1, the disclosed improvements are described with illustrative reference to a Business Continuity and Disaster Recovery (BCDR) system or other backup system that includes a backup entity 10 that provides BCDR service to a client entity 12. More particularly, the client entity 12 includes a file system 14, and the backup entity 10 stores a backup 16 of at least a portion of the file system 14 of the second entity. The illustrative BCDR operates by way of incremental backups in which changes to the file system 14 (or to the portion that is backed up) are transmitted relatively frequently (e.g., every 10 minutes). As is known in the art, incremental backup has substantial advantages, for example the amount of data that changes between incremental backups is small and so the incremental backup data that needs to be sent from the client entity 12 to the backup entity 10 in any given increment is small. This in turn permits high frequency incremental backups, which is advantageous because if a recovery is required then any data changed since the last incremental backup is lost. (Hence, if for example the incremental backup is performed every 10 minutes then at most about 10 minutes of activity at the client entity 12 may be lost). To perform an incremental backup, the backup entity 10 and client entity 12 (and more particularly a backup agent 18 comprising software running on one or more computers of the client entity 12) attempt to initiate a secure communication session 20 via an electronic network (for example, the Internet, and/or an Ethernet, WiFi, and/or the like), via which incremental backup data is transmitted from the client entity 12 to the backup entity 10. A backup service 22 (e.g. software program of software suite) running at the backup entity 10 cause the backup entity 10 to update the backup 16 stored at the backup entity 10 with the incremental backup data. While FIG. 1 illustrates a single client entity 12, in some embodiments the backup entity 10 may provide the backup service 22 to a number of clients serviced by the backup entity 10, and may store a backup 16 for each serviced entity. Furthermore, in the illustrative example, the backup 16 is occasionally transferred to a cloud-based backup service 24 which runs a backup archiving service 26 that communicates with the backup entity 10 to receive the backup 16 and store it in a backups archive 28. Again, while FIG. 1 illustrates a single backup entity 10, more generally there may be a number of backup entities each communicating with the cloud-based backup service 24 to archive their respective stored backups 16.

In the illustrative example, the cloud-based backup service 24 also provides a private certificate authority (CA) 30 for signing digital certificates of the backup entity 10 and client entity 12 using an issuer certificate published by the CA 30. The issuer certificate published by the CA 30 may be a trusted root certificate that is self-signed by the CA 30 (as in the illustrative examples), or the issuer certificate may be an intermediate certificate that is in turn signed by another private key corresponding to another published intermediate certificate or corresponding to a root certificate.

The illustrative BCDR system of FIG. 1 is to be understood as merely an illustrative example. More generally, the disclosed authentication of a secure communication session with fallback in case of new issuer certificate implementation latency can be performed in conjunction with a first entity 10 (e.g., the backup entity 10 in the illustrative example) and a second entity 12 (e.g., the client entity 12 in the illustrative example). As used herein, an "entity" is a computing device, or an electronic network of computing devices, or a virtualized computing device or electronic network. The computing device or devices may be a desktop computer, notebook computer, server computer, cellular telephone or other mobile computing device, an application-specific computing device having a digital processor or processors, or so forth. The electronic network of a given entity may be a wired electronic network such as a wired Ethernet, a wireless network such as a WiFi network, a hybrid wired/wireless electronic network, or so forth. A common example of an entity comprising an electronic network of computing devices is a private network (e.g., for a corporation, nonprofit organization, governmental organization, or the like) residing behind a firewall and accessible from outside the private network by designated ports with port numbers which are associated with Internet Protocol (IP) addresses. A virtualized computing device is implemented as a virtual machine (VM) running in a VM environment hosted on a physical computing device, such as a VMWare® or Microsoft Hyper-V VM environment. It is also contemplated for the virtualized computing device to be implemented in a VM hosted on another VM, and potentially so forth, ultimately hosted on a physical computing device.

In the illustrative example, the backup entity 10 and the backup agent 18 at the client entity 12 operate in a client/server relationship in which the backup agent 18 provides a server application programming interface (API) 40 with a port number associated with an IP address, which is accessible through the firewall of the client entity 12. In the context of the server/client relationship, the client entity 12 thus operates as the server, while the backup entity 10 connects as a client to the server API 40 provided by the backup agent 18 running at the client entity 12. To attempt to initiate a secure communication session for the purpose of receiving an incremental backup, the backup entity 10 initiates handshaking with the server API 40. In the illustrative examples, Transport Layer Security (TLS) is employed as the cryptographic protocol for the secure communication session, and more particularly mutual TLS in which the server API 40 provides its digital certificate to the client of the server/client connection (that is, the server API 40 provides its digital certificate to the backup entity 10), and (per the "mutual" in mutual TLS) the client (here backup entity 10) in turn supplies its digital certificate back to the server API 40. In each case, the supplied digital certificate is signed by the issuer certificate published by the CA 30.

As previously described, however, conventionally a problem could arise if the CA 30 publishes a new issuer certificate, and there is a different time latency between adoption of the new issuer certificate at the backup entity 10 and the client entity 12. In a common BCDR system scenario, the backup entity 10 is provided by and under control of a corporation or company that provides (or contracts to provide) the BCDR service. That same corporation or company, or one closely tied to it, also maintain the CA 30. By contrast, the backup agent 18 is installed on the client entity 12, and this installation is performed by, or at least overseen by, the IT department of the client. Access to the client entity 12 by the corporation or company providing the BCDR service is therefore usually limited, and as a consequence there is often a larger time latency for the client entity 12 to adopt a new issuer certificate from the CA 30 as compared with the backup entity 10. For example, the issuer certificate at the client entity 12 may only get updated when the computer running the backup agent 18 is rebooted, or when the backup agent 18 software is updated, or so forth.

More generally, the backup entity 10 interrogates the CA 30 for a new issuer certificate (in a pull framework) or is notified by the CA 30 of a new issuer certificate (in a push framework) at a backup entity cadence 42. Likewise, the client entity 12 interrogates the CA 30 for a new issuer certificate (in a pull framework) or is notified by the CA 30 of a new issuer certificate (in a push framework) at a client entity cadence 44. The term "cadence" is used herein to denote the frequency at which an entity interrogates the CA for a new issuer certificate in a pull framework, or the frequency at which the CA notifies an entity of the new issuer certificate in a push framework. For example, the cadence can be every 10 minutes, every two hours, every 24 hours, or so forth, where a cadence of every 10 minutes is a faster cadence than a cadence of every two hours and a cadence of every 24 hours is slower than a cadence of every 2 hours. In general, the cadence can be adjusted by the CA 30 in the case of a push framework, or by the entity 10, 12 in the case of a pull framework. The cadence may be increased at a predefined time interval before the expiration date of the issuer certificate, in anticipation of imminent publication of a new issuer certificate. If the cadence is set too high then this could potentially overload the server of the CA 30, thus simulating a denial of service (DOS) attack. Such an overload can occur in both push and pull frameworks, as the overload is primarily due to the computation required to cryptographically sign the CSRs.

At any given time, the backup entity 10 has an issuer certificate 52. Likewise, the client entity 12 has an issuer certificate 54 that is current at the client, which however may be older than the issuer certificate 52 at the backup entity 10. In similar fashion, the backup entity 10 has a backup entity digital certificate 56 that is signed by the issuer certificate 52 at the backup entity 10. Likewise, the client entity 12 has a client entity digital certificate 58 that is signed by the issuer certificate 54 current at the client, which again may be older than the issuer certificate 52 at the backup entity 10.

Conventionally, the handshaking to initiate a secure communication session includes the following: the server API 40 responds to the handshaking request from the backup entity 10 (which is the client respective to the server API 40) by sending the client entity certificate 58 to the backup entity 10. The backup entity 10 then authenticates the received client entity certificate using its issuer certificate 52, and sends its backup entity certificate 56 to the server API 40. As long as the issuer certificate 52 at the backup entity 10 (i.e. server) and the issuer certificate 54 at the server API 40 are the same, the handshaking will be successful because that singular issuer certificate is effective to authenticate both entity certificates 56, 58 (since they were both signed by that singular issuer certificate).

A problem arises, however, if the issuer certificate 54 current at the server API 40 different (e.g. older) than the issuer certificate 52 at the client (which, again, is the backup entity 10 in this example). In this case, the client (backup entity 10) will attempt to authenticate the digital certificate 58 received from the server API 40 using its newer issuer certificate 52, and this authentication will fail (because the certificate was signed by the older issuer certificate held by the server API 40, and not by the newer issuer certificate held by the backup entity 10). Likewise, if the client (backup entity 10) sends its backup entity digital certificate 56 to the server API 40, then the server API 40 will attempt to authenticate the digital certificate 56 received from the backup entity 10 using its older issuer certificate 52, and this authentication also will fail. In this case, a secure communication session cannot be established between the backup entity 10 and the client entity 12, until the client entity 12 adopts the newer issuer certificate. As previously noted, this could take some time if the client entity cadence 44 is slow, or if the update of the issuer certificate must be done manually. If, for example, it takes a day or more for the backup agent 18 to be updated with the new issuer certificate, then this is a day or more over which no incremental backups will be performed. If a recovery is required in this interval, then the recovery point may be very old, e.g. a day or longer. (Analogously, if the first and second entities are financial institution computing systems, then this would be a day or more over which the financial institutions would be unable to engage in automated financial transactions).

To address this problem, in the BCDR system of FIG. 1, the backup entity 10 further stores an old issuer certificate 60 and an old backup entity certificate 62 signed by the old issuer certificate. In other words, each time the backup entity 10 receives a new issuer certificate, it saves the old issuer certificate 60 and its backup entity digital certificate 62 signed by the old issuer digital certificate; the new issuer certificate becomes the issuer certificate 52, and after creating a new public/private key pair, preparing a CSR and sending it to the CA 30 and receiving back a new backup entity digital certificate, that new backup entity digital certificate becomes the backup entity digital certificate 56 signed by the issuer certificate 52. With this additional information 60, 62, the problem of the issuer certificate 54 at the client entity 12 being old is remediated as follows. The backup entity 10 receives the client entity digital certificate 58 from the client entity 12 via the electronic network as before. The backup entity 10 then sends either the backup entity digital certificate 56 or the old backup entity digital certificate 62 to the client entity 12 via the electronic network, with the choice of which digital certificate 56, 62 to send being based on which of the issuer digital certificate 52 or the old issuer digital certificate 60 is effective to authenticate the client entity digital certificate 58 received from the second entity.

Figure 2:
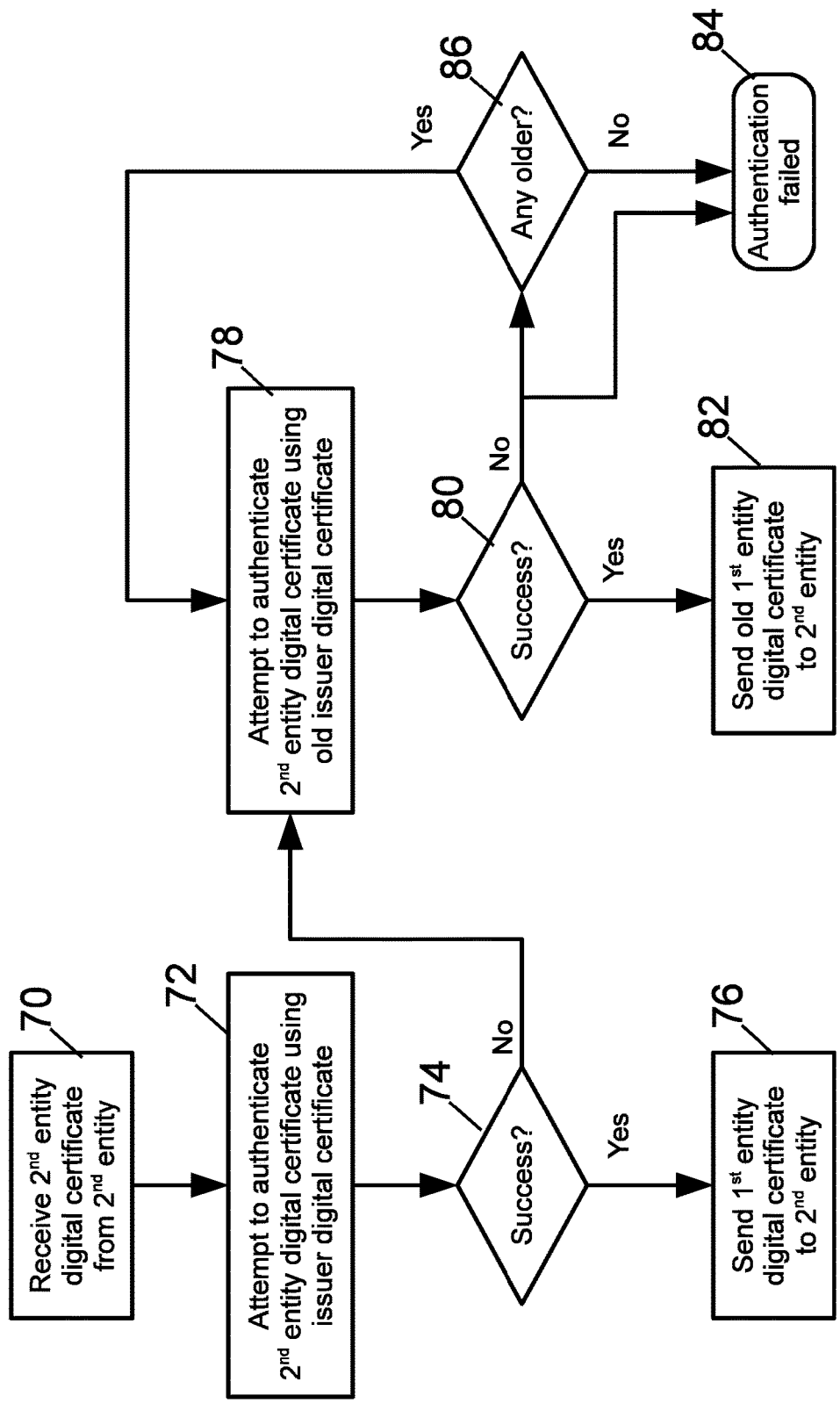
FIG. 2 diagrammatically illustrates a method of authentication performed by the first entity (e.g. backup entity in the example of FIG. 1) with fallback in case of new issuer certificate implementation latency.

With reference now to FIG. 2, a suitable approach for this selection performed by the first entity 10 is described. In this example, the general terms first entity 10 and second entity 12 are used. For the illustrative BCDR system of FIG. 1, the first entity 10 is the backup entity and the second entity 12 is the client entity 12 hosting the server API 40, but more generally the first entity 10 and second entity 12 can be any two entities initiating a secure communication session as here disclosed. At an operation 70, the first entity receives the second entity digital certificate 54 from the second entity 12. At an operation 72, the first entity 10 attempts to authenticate the received second entity digital certificate 54 using the issuer digital certificate 52. If at a decision operation 74 it is determined that the authentication operation 72 was successful, then this means that the issuer digital certificate 52 held at the first entity 10 is the same as the issuer digital certificate 54 current at the second entity 12; accordingly, in an operation 76 the first entity 10 sends its first entity digital certificate 56 (which is signed by the issuer digital certificate 52) to the second entity 12. It is expected that the second entity 12 will successfully authenticate the first entity digital certificate 56 using the issuer digital certificate 54 current at the second entity 12.

On the other hand, if at the decision operation 74 it is determined that the authentication operation 72 was not successful, then this means that the issuer digital certificate 52 held at the first entity 10 is different from the issuer digital certificate 54 current at the second entity 12. Accordingly, at an operation 78, the first entity 10 attempts to authenticate the received second entity digital certificate 54 using the old issuer digital certificate 60. If at a decision operation 80 it is determined that the authentication operation 78 was successful, then this means that the old issuer digital certificate 60 held at the first entity 10 is the same as the issuer digital certificate 54 current at the second entity 12. In other words, the first entity 10 has adopted a new issuer digital certificate while the second entity 12 is still using the old issuer digital certificate. Accordingly, in an operation 82 the first entity 10 sends the old first entity digital certificate 62 (which is signed by the old issuer digital certificate 60) to the second entity 12. It is expected that the second entity 12 will successfully authenticate the old first entity digital certificate 62 using the issuer digital certificate 54 current at the second entity 12 (which is now known to correspond to the old issuer digital certificate 60).

On the other hand, if at the decision operation 80 it is determined that the authentication operation 78 was not successful, then this means that the old issuer digital certificate 60 held at the first entity 10 is also different from the issuer digital certificate 54 current at the second entity 12. In some embodiments, this immediately results in an authentication failed operation 84 in which the secure communication session is not initiated. Alternatively, in some embodiments the first entity 10 may store more than one old issuer certificate and corresponding old first entity digital certificate signed thereby. For example, the first entity 10 may store the last two iterations of old issuer digital certificate/first entity certificates. In this case, an optional operation 86 checks if an "older" old issuer digital certificate is available, and if so flow returns to operation 78 to check if this "older" old issuer digital certificate can authenticate the received second entity digital certificate. This loop repeats in reverse date order of the old issuer digital certificates until an authentication operation 78 is successful at which point the corresponding first entity digital certificate is sent to the second entity 12 in operation 82; or until all older issuer digital certificates have been tested and have all failed to authenticate the second entity digital certificate, at which point the authentication failed operation 84 is reached.

As noted above, if at the decision operation 74 it is determined that the authentication operation 72 was not successful, then this means that the issuer digital certificate 52 held at the first entity 10 is different from the issuer digital certificate 54 current at the second entity 12. The disclosed remediation operations 78, 80, 82 operate on the assumption that, more specifically, the issuer digital certificate 52 held at the first entity 10 is more recently published than the issuer digital certificate 54 current at the second entity 12. If this assumption is wrong (if in fact the issuer digital certificate 54 current at the second entity 12 is the newer one) then the authentication operation 78 will also fail, leading to authentication failure 84.

In some variant embodiments, an additional measure is taken to assure (or at least increase the likelihood) of correctness of the assumption that the issuer digital certificate 52 is the same as or more recent than the issuer digital certificate 54 current at the second entity 12. In these variant embodiments, the first cadence 42 (see FIG. 1) is set to be faster than the second cadence 44. In other words, the first entity 10 is set to check for updates of the issuer digital certificate more frequently than the second entity 12. This increases the likelihood that the first entity 10 will adopt a newly published issuer digital certificate before the second entity 12 does so. For example, in some nonlimiting illustrative embodiments, the first cadence 42 is at least ten times faster than the second cadence 44. In some embodiments, this is accomplished by the first entity 10 being configured to have the first cadence 42 set by the CA 30, and the second entity 12 also being configured to have the second cadence 44 set by the CA 30. This allows the CA 30 to control both cadences 42, 44.

Figure 3:
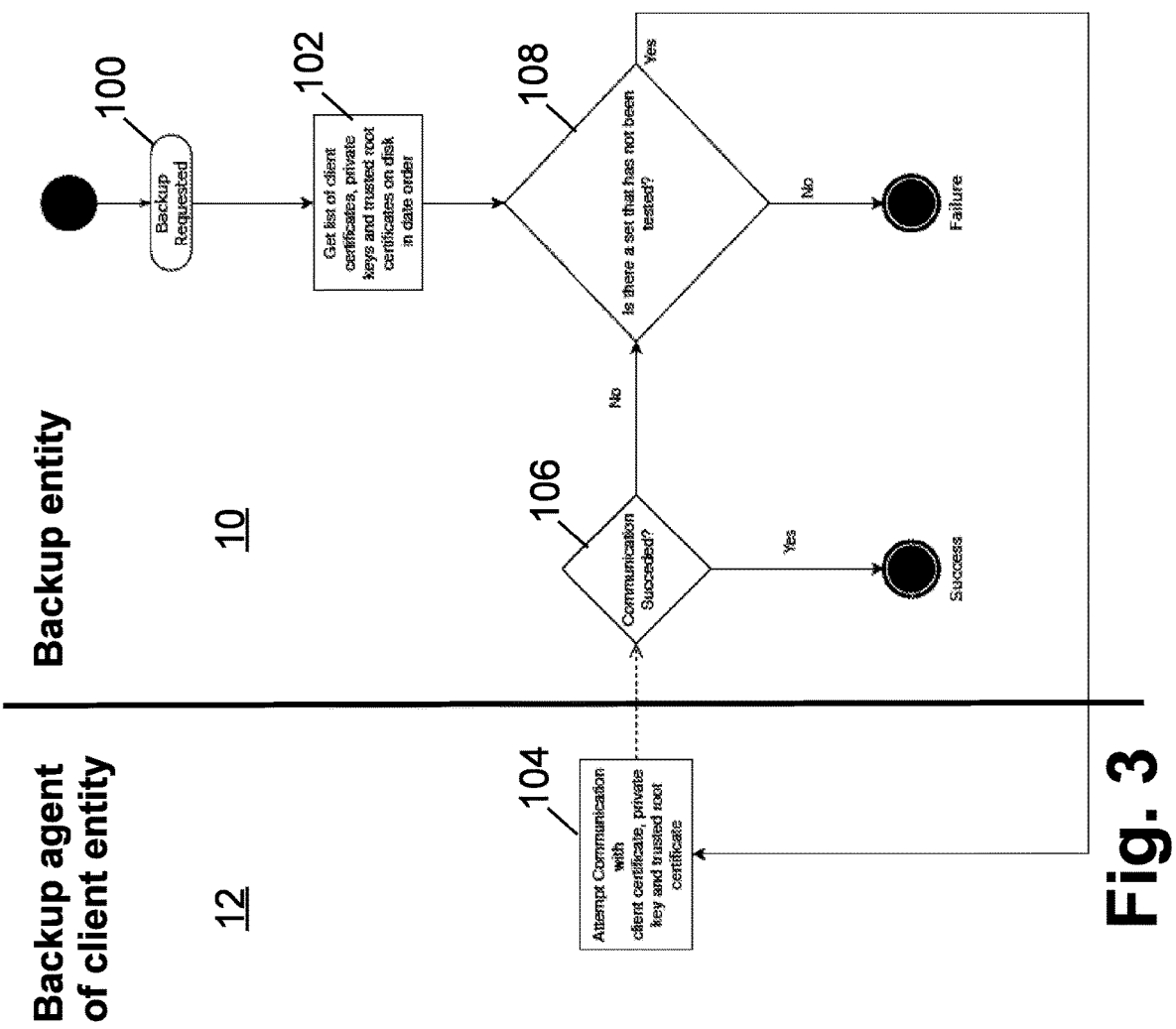
FIG. 3 diagrammatically illustrates an example of authentication with fallback in case of new issuer certificate implementation latency in a BCDR context.

With reference now to FIG. 3, an example of authentication with fallback in case of new issuer certificate implementation latency in a BCDR context is described. At an operation 100, the backup entity 10 contacts the server API 40 of the backup agent 18 of the client entity 12 to request performing an incremental backup. Additionally, at an operation 102 the backup entity 10 retrieves the stored old confidential information including in this example a list of client certificates, private keys, and trusted root certificates in date order. (Note that in this example the issuer digital certificates are trusted root certificates). At an operation 104, the server API 40 of the backup agent 18 of the client entity 12 sends its client entity certificate 58 to the backup entity 10. At a decision 106 it is determined whether the communication succeeded. If not, then at a decision 108 it is determined whether the communication can succeed using the old confidential information retrieved at operation 102. If the communication cannot succeed with the old confidential information as well, then the attempt to initiate the secure communication session fails.

Figure 4:
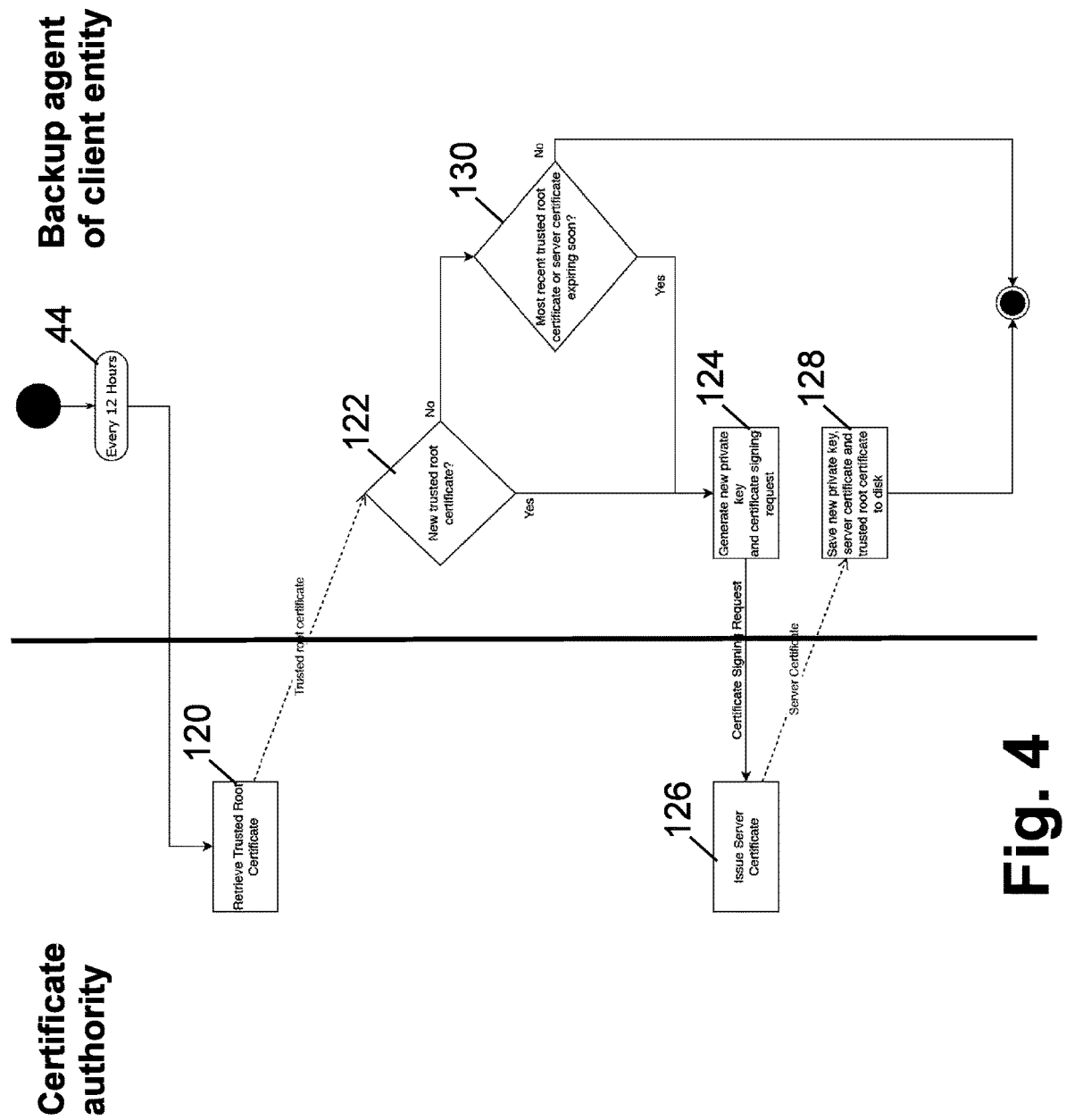
FIG. 4 diagrammatically illustrates an example of receipt and implementation of a new issuer certificate at the backup agent of the client entity.

FIG. 4 diagrammatically illustrates an example of receipt and implementation of a new issuer certificate at the backup agent 18 of the client entity 12. In this example, a pull framework is used, in which at the second cadence 44 (set to a relatively slow value of every 12 hours in this example) the backup agent retrieves the trusted root certificate 120 that is currently being published by the CA 30. At a decision operation 122 it is determined whether the retrieved trusted root certificate is a new certificate (compared with the trusted root certificate currently being used at the client entity 12). If it is a new trusted root certificate, then at an operation 124 the client entity 12 (and more particularly the backup agent 18) generates a new pair of private and public keys, and generates the certificate signing request (CSR) signed using the newly generated private key and containing the newly generated public key. The CSR is sent to the CA 30 which then issues a new server certificate at an operation 126 (i.e., the server certificate corresponds to the client entity certificate 58 of FIG. 1). At an operation 128, the client entity 12 receives the new server certificate and saves the new private key and server certificate to disk or other non-transitory storage.

On the other hand, if at the decision operation 122 it is determined that the retrieved trusted root certificate is not a new certificate, then at an operation 130 the expiration dates of the current trusted root certificate 54 and client entity certificate 58 are checked, and if the client entity certificate is near expiration then flow passes to operation 124 to obtain a new certificate (albeit in this case signed using the existing trusted root certificate).

Figure 5:
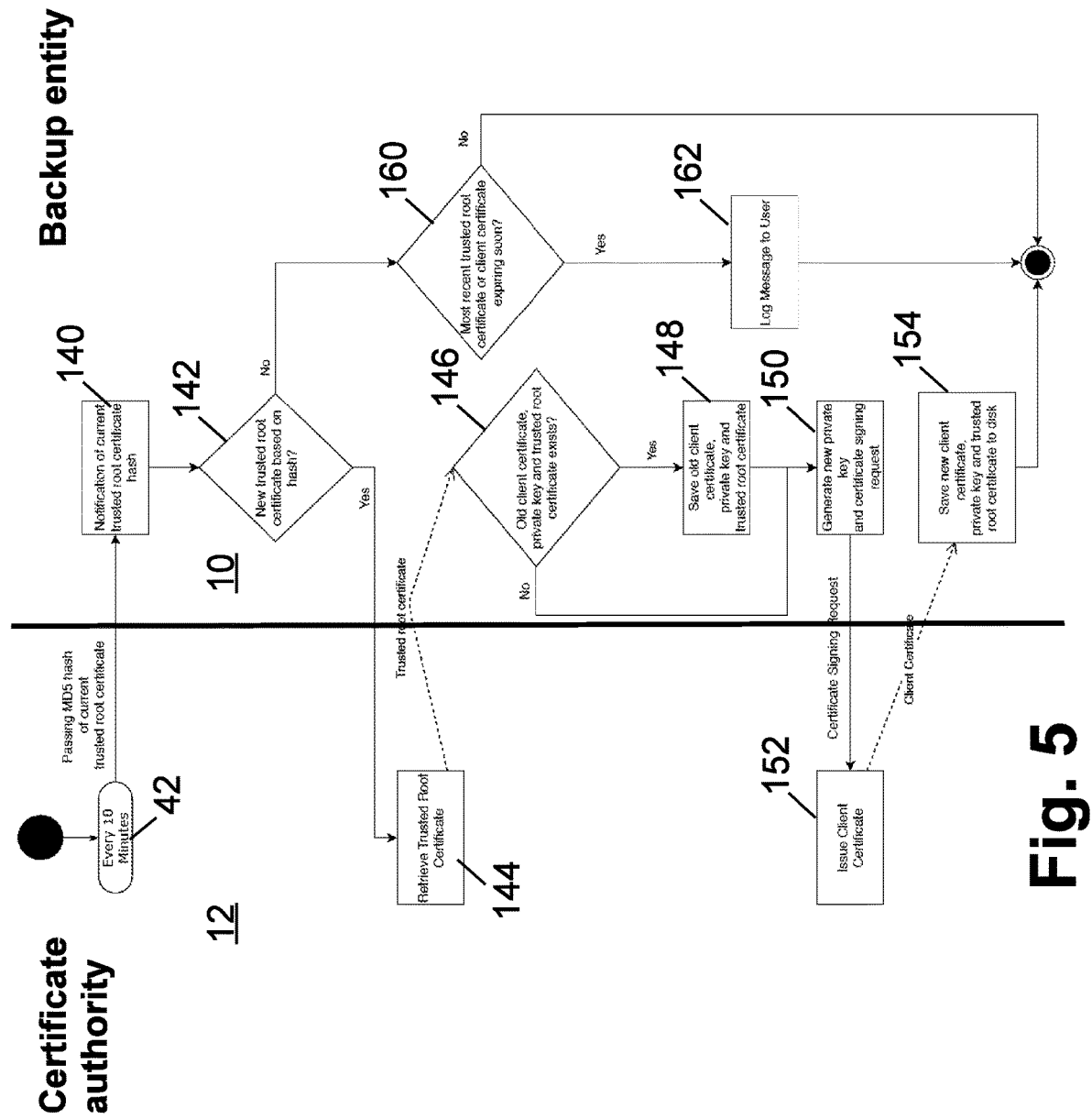
FIG. 5 diagrammatically illustrates an example of receipt and implementation of a new issuer certificate at the backup entity.

FIG. 5 diagrammatically illustrates an example of receipt and implementation of a new issuer certificate at the backup entity 10. In this example, a push framework is used, in which at the first cadence 42 (set to a relatively fast value of every 10 minutes in this example) the CA 30 passes an MD5 hash of the current trusted root certificate to the backup entity 10. At an operation 140, the backup entity 10 receives the notification of the current trusted root certificate hash. At an operation 142, it is determined whether a new trusted root certificate is available based on the hash. If so, then at an operation 144 the new trusted root certificate is retrieved from the CA 30. At a decision operation 146, it is determined whether the backup entity 10 already has stored confidential information (client certificate, private key, and trusted root certificate in this example). If so, then in an operation 148 this information is saved as the old client certificate, private key, and trusted root certificate (this is a variant of the stored confidential information 60, 62 of FIG. 1). If on the other hand the decision operation 146 does not identify any stored confidential information then the operation 148 is skipped. At an operation 150, the backup entity 10 generates a new pair of private and public keys, and generates the certificate signing request (CSR) signed using the newly generated private key and containing the newly generated public key. The CSR is sent to the CA 30 which then issues a new server certificate at an operation 152 (i.e., the server certificate corresponds to the backup entity certificate 56 of FIG. 1). At an operation 154, the client entity 12 receives the new certificate and saves the new private key and server certificate to disk or other non-transitory storage.

On the other hand, if at the decision operation 142 it is determined that a new trusted root certificate is not available based on the hash, then at an operation 160 the expiration dates of the current trusted root certificate 54 and backup entity certificate 56 are checked, and if either certificate is near expiration then a message to the user is logged at an operation 162.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A non-transitory storage medium storing instructions readable and executable by an electronic processor of a first entity to cause the first entity to:

store an issuer digital certificate published by a certificate authority (CA) and a first entity digital certificate signed by the issuer certificate;

store an old issuer digital certificate published by the CA prior to publication of the issuer digital certificate and an old first entity digital certificate signed by the old issuer digital certificate;

attempt to initiate a secure communication session with a second entity via an electronic network by operations including receiving a second entity digital certificate from the second entity via the electronic network and sending either the first entity digital certificate or the old first entity digital certificate to the second entity via the electronic network based on which of the issuer digital certificate or the old issuer digital certificate is effective to authenticate the second entity digital certificate received from the second entity; and conduct the secure communication session with the second entity via the electronic network only if the attempt to initiate the secure communication session is successful, wherein the instructions are readable and executable by the electronic processor of the first entity to further cause the first entity to:

at a first entity cadence, determine whether a new issuer digital certificate different from the issuer digital certificate has been published by the CA and if so then:

generate a public/private key pair at the first entity, construct a certificate signing request (CSR) including a public key of the public/private key pair and signed using the private key of the public/private key pair, and receive a new first entity digital certificate from the CA in response to transmitting the CSR to the CA;

update the old issuer digital certificate to include the issuer digital certificate and update the old first entity digital certificate to include the first entity digital certificate; and update the issuer digital certificate to be the new issuer digital certificate and update the first entity digital certificate to be the new first entity digital certificate, and wherein the second entity is configured to, at a second cadence that is slower than the first cadence, determine whether a new issuer digital certificate different from the second entity issuer digital certificate has been published by the CA and if so then generate a second entity public/private key pair, construct a second entity CSR including a second entity public key of the second entity public/private key pair and signed using a second entity private key of the second entity public/private key pair, and receive a new second entity digital certificate from the CA in response to transmitting the second entity CSR to the CA.

2. The non-transitory storage medium of claim 1 wherein the attempt to initiate the secure communication session includes attempting to authenticate the second entity digital certificate using the issuer digital certificate and one of:
 (i) responsive to successful authentication of the second entity digital certificate using the issuer digital certificate, sending the first entity digital certificate signed by the issuer digital certificate to the second entity via the electronic network or (ii) responsive to unsuccessful authentication of the second entity digital certificate using the issuer digital certificate, attempting to authenticate the second entity digital certificate using the old issuer digital certificate and responsive to successful authentication of the second entity digital certificate using the old issuer digital certificate sending the old first entity digital certificate signed by the old issuer digital certificate to the second entity via the electronic network.

3. The non-transitory storage medium of claim 1 wherein the secure communication session is a mutual Transport Layer Security (TLS) secure communication session.

4. The non-transitory storage medium of claim 1 wherein:
 the conducting of the secure communication session with the second entity via the electronic network includes receiving incremental backup data for the second entity via the secure communication session; and
 the instructions are readable and executable by the electronic processor of the first entity to further cause the first entity to update a backup of data of the second entity with the incremental backup data for the second entity received via the secure communication session.

5. The non-transitory storage medium of claim 1 wherein the first entity is configured to have the first cadence set by the CA, and the second entity is configured to have the second cadence set by the CA.

6. The non-transitory storage medium of claim 1 wherein the first cadence is at least ten times faster than the second cadence.

7. A system comprising:
 a first entity comprising at least one electronic processor, the first entity storing an issuer digital certificate published by a certificate authority (CA) and a first entity digital certificate signed by the issuer digital certificate and further storing an old issuer digital certificate published by the CA prior to publication of the issuer digital certificate and an old first entity digital certificate signed by the old issuer digital certificate;
 a second entity comprising at least one electronic processor, the second entity storing a second entity issuer digital certificate published by the CA and a second entity digital certificate signed by the second entity issuer digital certificate;
 wherein the first entity is programmed to initiate a secure communication session with the second entity via an electronic network by receiving the second entity digital certificate from the first entity via the electronic network and sending either the first entity digital certificate or the old first entity digital certificate to the second entity via the electronic network based on which of the issuer digital certificate or the old issuer digital certificate is effective to authenticate the second entity digital certificate received from the second entity;
 wherein the second entity is configured to attempt to authenticate the first entity digital certificate received from the first entity or the old first entity digital certificate received from the first entity using the second entity issuer digital certificate, the secure communication session being conducted contingent upon successful authentication by the second entity of the first entity digital certificate received from the first entity or the old first entity digital certificate received from the first entity;
 wherein the first entity is further programmed to:
 at a first entity cadence, determine whether a new issuer digital certificate different from the issuer digital certificate has been published by the CA and if so then:
  generate a public/private key pair at the first entity, construct a certificate signing request (CSR) including a public key of the public/private key pair and signed using a private key of the public/private key pair, and receive a new first entity digital certificate from the CA in response to transmitting the CSR to the CA;
  update the old issuer digital certificate to include the issuer digital certificate and update the old first entity digital certificate to include the first entity digital certificate; and
  update the issuer digital certificate to be the new issuer digital certificate and update the first entity digital certificate to be the new first entity digital certificate; and
 wherein the second entity is configured to, at a second cadence that is slower than the first cadence, determine whether a new issuer digital certificate different from the second entity issuer digital certificate has been published by the CA and if so then generate a second entity public/private key pair, construct a second entity CSR including a second entity public key of the second entity public/private key pair and signed using a second entity private key of the second entity public/private key pair, and receive a new second entity digital certificate from the CA in response to transmitting the second entity CSR to the CA.

8. The system of claim 7 wherein the first entity is programmed to send either the first entity digital certificate or the old first entity digital certificate to the second entity via the electronic network by attempting to authenticate the second entity digital certificate using the issuer digital certificate and one of:
 (i) responsive to successful authentication of the second entity digital certificate using the issuer digital certificate, sending the first entity digital certificate signed by the issuer digital certificate to the second entity via the electronic network or (ii) responsive to unsuccessful authentication of the second entity digital certificate using the issuer digital certificate, attempting to authenticate the second entity digital certificate using the old issuer digital certificate and responsive to successful authentication of the second entity digital certificate using the old issuer digital certificate sending the old first entity digital certificate signed by the old issuer digital certificate to the second entity via the electronic network.

9. The system of claim 7 wherein the first entity is configured to have the first cadence set by the CA, and the second entity is configured to have the second cadence set by the CA.

10. The system of claim 7 wherein the first cadence is at least ten times faster than the second cadence.

11. The system of claim 7 wherein the secure communication session is a mutual Transport Layer Security (TLS) secure communication session.

12. The system of claim 7 wherein:
the second entity includes a file system;
the first entity stores a backup of at least a portion of the file system of the second entity;
the secure communication session includes transmission of incremental backup data from the second entity to the first entity; and
the first entity is further programmed to cause the first entity to update the backup stored at the first entity with the incremental backup data.

13. A method comprising:
storing a backup at a first entity of at least a portion of a file system of a second entity;
at a first cadence, automatically checking with a certificate authority (CA) for updates of an issuer digital certificate stored at a first entity comprising at least one electronic processor;
at a second cadence that is slower than the first cadence, automatically checking with the CA for updates of an issuer digital certificate stored at a second entity comprising at least one electronic processor;
initiating a secure communication session via an electronic network between the first entity and the second entity by operations including sending a second entity digital certificate signed by the CA from the second entity to the first entity and sending a first entity digital certificate signed by the CA from the first entity to the second entity;
via the initiated secure communication session, transmitting incremental backup data from the second entity to the first entity; and
at the first entity, updating the backup with the incremental backup data.

14. The method of claim 13 wherein the first cadence is at least ten times faster than the second cadence.

15. The method of claim 13 further comprising:
storing at the first entity an issuer digital certificate published by the CA and a first entity digital certificate signed by the issuer digital certificate and further storing an old issuer digital certificate published by the CA prior to publication of the issuer digital certificate and an old first entity digital certificate signed by the old issuer digital certificate;
wherein the sending of a first entity digital certificate signed by the CA from the first entity to the second entity comprises sending either the first entity digital certificate or the old first entity digital certificate to the second entity via the electronic network based on which of the issuer digital certificate or the old issuer digital certificate is effective to authenticate the second entity digital certificate.

16. The method of claim 15 further comprising:
by the automatically checking with the CA for updates of an issuer digital certificate stored at a first entity comprising at least one electronic processor, determining that a new issuer digital certificate different from the issuer digital certificate has been published by the CA and in response:
generating a public/private key pair at the first entity, constructing a certificate signing request (CSR) including a public key of the public/private key pair and signed using a private key of the public/private key pair, and receiving a new first entity digital certificate from the CA in response to transmitting the CSR to the CA;
updating the old issuer digital certificate to include the issuer digital certificate and updating the old first entity digital certificate to include the first entity digital certificate; and
updating the issuer digital certificate to be the new issuer digital certificate and updating the first entity digital certificate to be the new first entity digital certificate.

17. The method of claim 13 wherein the secure communication session is a mutual Transport Layer Security (TLS) secure communication session.

* * * * *

UNITED STATES PATENT AND TRADEMARK OFFICE
CERTIFICATE OF CORRECTION

PATENT NO. : 11,509,487 B2
APPLICATION NO. : 17/021232
DATED : November 22, 2022
INVENTOR(S) : Barbe et al.

Page 1 of 1

It is certified that error appears in the above-identified patent and that said Letters Patent is hereby corrected as shown below:

In the Specification

Column 1, Lines 16-17 replace "It finds particular application" with -- It finds a particular application --
Column 3, Lines 34-35 replace "e.g. backup entity" with -- e.g., backup entity --
Column 3, Line 53 replace "e.g. computing devices" with -- e.g., computing devices --
Column 4, Lines 18-19 replace "(i.e. binds)" with -- (i.e., binds) --
Column 4, Line 66 replace "e.g. every few" with -- e.g., every few --
Column 6, Line 42 replace "because if a recovery is required then any data" with -- because if a recovery is required, then any data --
Column 6, Line 54 replace "e.g. software program" with -- e.g., software program --
Column 6, Lines 65-66 replace "store it in a backups archive 28." with -- store it in a backup archive 28. --
Column 9, Lines 2-3 replace "(i.e. server)" with -- (i.e., server) --
Column 9, Line 9 replace "at the server API 40 different (e.g. older)" with -- at the server API 40 is different (e.g., older) --
Column 9, Line 32 replace "e.g. a day" with -- e.g., a day --
Column 10, Line 54 replace "and if so flow returns" with -- and if so, flow returns --
Column 12, Lines 7-8 replace "and client entity certificate 58" with -- and the client entity certificate 58 --
Column 12, Line 32 replace "confidential information then the operation" with -- confidential information, then the operation --
Column 12, Line 34 replace "public keys, and generates" with -- public keys and generates --

In the Claims

Column 14, Line 45 replace "at a first entity cadence," with -- at a first cadence, --
Column 16, Line 16 replace "at a first entity cadence," with -- at a first cadence, --

Signed and Sealed this
Second Day of January, 2024

Katherine Kelly Vidal
*Director of the United States Patent and Trademark Office*